(12) United States Patent
Lu

(10) Patent No.: US 9,538,815 B2
(45) Date of Patent: Jan. 10, 2017

(54) FASTENER ASSEMBLY

(71) Applicant: GUANGDONG HHS HEAVY DUTY PACKAGING GROUP CO., LTD., Dongguan (CN)

(72) Inventor: Hua-Tang Lu, Dongguan (CN)

( * ) Notice: Subject to any disclaimer, the term of this patent is extended or adjusted under 35 U.S.C. 154(b) by 0 days.

(21) Appl. No.: 14/377,179

(22) PCT Filed: Jun. 19, 2013

(86) PCT No.: PCT/CN2013/077432
§ 371 (c)(1),
(2) Date: Aug. 7, 2014

(87) PCT Pub. No.: WO2014/172975
PCT Pub. Date: Oct. 30, 2014

(65) Prior Publication Data
US 2016/0183638 A1    Jun. 30, 2016

(30) Foreign Application Priority Data

Apr. 24, 2013   (CN) .......................... 2013 1 0143824

(51) Int. Cl.
*A44B 17/00*   (2006.01)
*F16B 5/06*    (2006.01)
(Continued)

(52) U.S. Cl.
CPC ....... *A44B 17/0047* (2013.01); *A44B 17/0023* (2013.01); *F16B 5/0642* (2013.01);
(Continued)

(58) Field of Classification Search
CPC ....... F16B 5/0642; F16B 21/073; F16B 21/07;
F16B 43/00; B65D 55/02; A44B 17/0023; A44B 17/0047; Y10T 24/44026
See application file for complete search history.

(56) References Cited

U.S. PATENT DOCUMENTS

| 1,890,348 A | * | 12/1932 | Weatherhead, Jr. | .. F16B 21/073 174/153 G |
| 2,552,066 A | * | 5/1951 | Sorensen | ................. F16B 5/10 411/349 |

(Continued)

FOREIGN PATENT DOCUMENTS

CN    101966881 A   *   2/2011   ............. B65D 25/00

OTHER PUBLICATIONS

English Machine translation of CN 101966881 (A) from Espacnet, retrieved Jun. 30, 2016.*

*Primary Examiner* — Robert J Sandy

(57) ABSTRACT

A fastener assembly contains: a first disc with a plurality of tip teeth, an engaging cylinder, a second disc, a retaining element, and a third disc. The engaging cylinder includes a first engagement structure formed on an inner wall thereof, and the engaging cylinder is connected with the first disc to form a main fastener. The second disc includes a through hole defined on a central position thereof and plural recesses radially extending from a peripheral side of the through hole, wherein the engaging cylinder inserts through and retains with the through hole of the second disc so that the engaging cylinder engages with the second disc. The retaining element is cylindrical or columnar and includes a second engagement structure arranged on a first end thereof, wherein a second end of the retaining element is coupled with the third disc to form an auxiliary fastener.

6 Claims, 4 Drawing Sheets

(51) Int. Cl.
*F16B 21/07* (2006.01)
*F16B 43/00* (2006.01)

(52) U.S. Cl.
CPC ............ *F16B 21/07* (2013.01); *F16B 21/073* (2013.01); *F16B 43/00* (2013.01); *Y10T 24/44026* (2015.01)

(56) References Cited

U.S. PATENT DOCUMENTS

| | | | |
|---|---|---|---|
| 4,274,511 A * | 6/1981 | Moriya | F16D 66/024 188/1.11 L |
| 7,257,867 B2 * | 8/2007 | Mizukoshi | B60R 13/08 24/297 |

* cited by examiner

FASTENER ASSEMBLY

FIELD OF THE INVENTION

The present invention relates to a connecting member for a package box, and more particularly to a fastener assembly for sewing a cardboard or a wooden board of the package box.

BACKGROUND OF THE INVENTION

A conventional package box is made of a cardboard to package and protect commodities during delivery.

A connecting screw disclosed in CN Patent No. 101966881A is employed to sewing the package box and contains a body, a hexagon extension, a first coupling member, a second coupling member, and a third coupling member. The body is riveted with the first coupling member to form a first connection unit, and the third coupling member is screwed with a hexagon nut of the hexagon extension to form the second connection unit. As sewing an inner paper board and an outer paper board of the cardboard, the first connection unit is placed on the inner paper board, and at least one tip tooth of the first coupling member pierces into the inner paper board, the second connection unit is fixed on the outer paper board, the second coupling member retains with the body and is defined between the inner paper board and the outer paper board, and a free end of the hexagon extension screws with the body so that the inner paper board and the outer paper board are sewed together.

However, the inner paper board and the outer paper board are sewed together by ways of the hexagon extension and the body, so a tool, such as a Phillips screwdriver, a wrench, or pliers, has to be used to operate the hexagon extension and the body, thus causing troublesome operation.

Furthermore, as packing or unpacking the cardboard, the tool for screwing or unscrewing the hexagon extension is required, thereby increasing operation cost.

The present invention has arisen to mitigate and/or obviate the afore-described disadvantages.

SUMMARY OF THE INVENTION

The primary object of the present invention is to provide a fastener assembly in which a main fastener and an auxiliary fastener are placed on an inner paper board ad an outer paper board of a cardboard, and a second disc is defined between the inner paper board and the outer paper board, thereafter the auxiliary fastener is pressed to fasten with the main fastener easily.

Further object of the present invention is to provide a fastener assembly which is simplified and manufactured easily.

Another object of the present invention is to provide a fastener assembly which is applicable for sewing a cardboard or a wooden board of a package box.

A fastener assembly provided by the present invention contains: a first disc with a plurality of tip teeth, an engaging cylinder, a second disc, a retaining element, and a third disc.

The engaging cylinder is hollow and includes a first engagement structure formed on an inner wall thereof, and the engaging cylinder is connected with the first disc to form a main fastener.

The second disc includes a through hole defined on a central position thereof and plural recesses radially extending from a peripheral side of the through hole, wherein the engaging cylinder inserts through and retains with the through hole of the second disc so that the engaging cylinder engages with the second disc.

The retaining element is cylindrical or columnar and includes a second engagement structure arranged on a first end thereof, wherein a second end of the retaining element is coupled with the third disc to form an auxiliary fastener.

The first end of the retaining element is inserted into the engaging cylinder so that the first engagement structure engages with the second engagement structure, thus retaining the main fastener with the auxiliary fastener.

Preferably, the first engagement structure has plural elongated orifices defined on an outer wall of the engaging cylinder and plural flexible slats extending to the inner wall of the engaging cylinder from the plural elongated orifices, and a first end of each flexible slat adjacent to the first disc is a free end and extends into the engaging cylinder to engage with the retaining element, a second end of each flexible slat is one piece formed with the engaging cylinder.

Preferably, a number of the plural flexible slats is at least one.

Preferably, the second engagement structure has a snap portion radially extending from the first end of the retaining element and a conical section defined between the snap portion and the second end of the retaining element; the snap portion is formed in a conical disk shape and has a small-diameter segment arranged on the first end of the retaining element to insert into the engaging cylinder; or the snap portion is formed in a conical post shape and has the small-diameter segment arranged on the first end of the retaining element to insert into and retain with the engaging cylinder, such that when the retaining element is inserted into the engaging cylinder, a gap is formed between the conical section and the inner wall of the engaging cylinder so that the two flexible slats insert into the engaging cylinder to retain with the snap portion.

Preferably, a number of the plurality of tip teeth is at least four tip teeth symmetrically arranged on the first disc.

Preferably, the first disc also includes plural fixing apertures for removing the first disc from the cardboard easily.

DETAILED DESCRIPTION OF THE PREFERRED EMBODIMENTS

Figure 1:
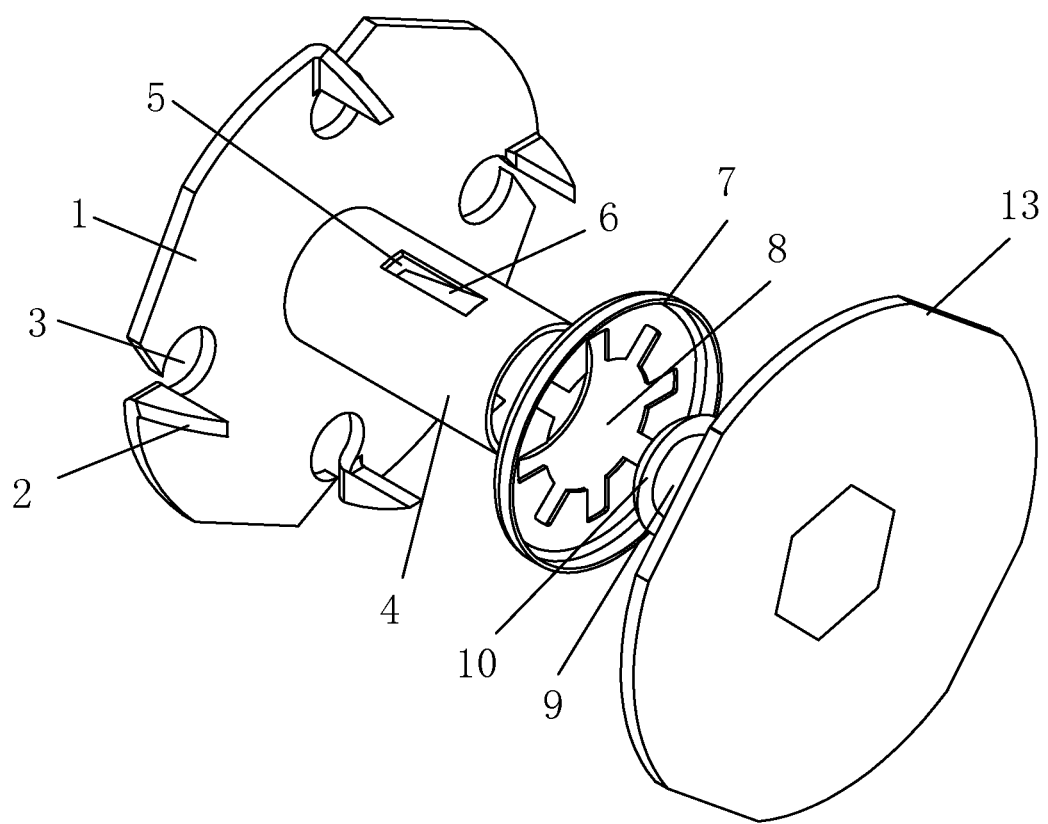
FIG. 1 is a perspective view showing the exploded components of a fastener assembly according to a preferred embodiment of the present invention.
Figure 2:
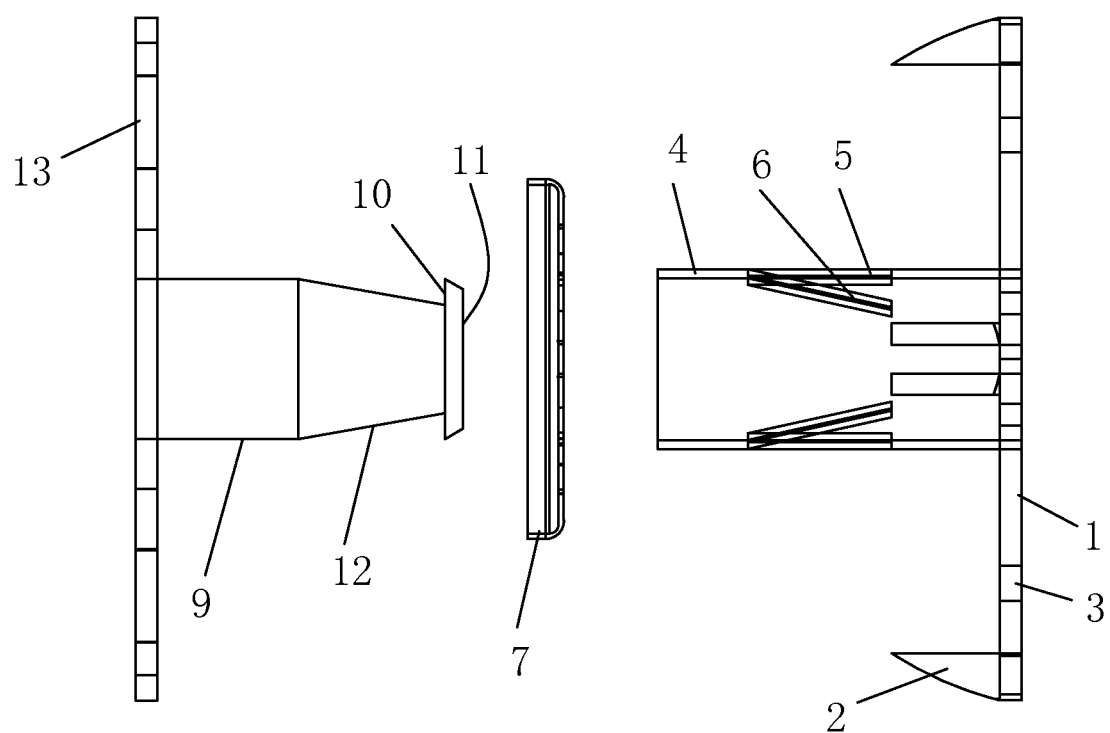
FIG. 2 is a side plan view showing the exploded components of the fastener assembly according to the preferred embodiment of the present invention.
Figure 3:
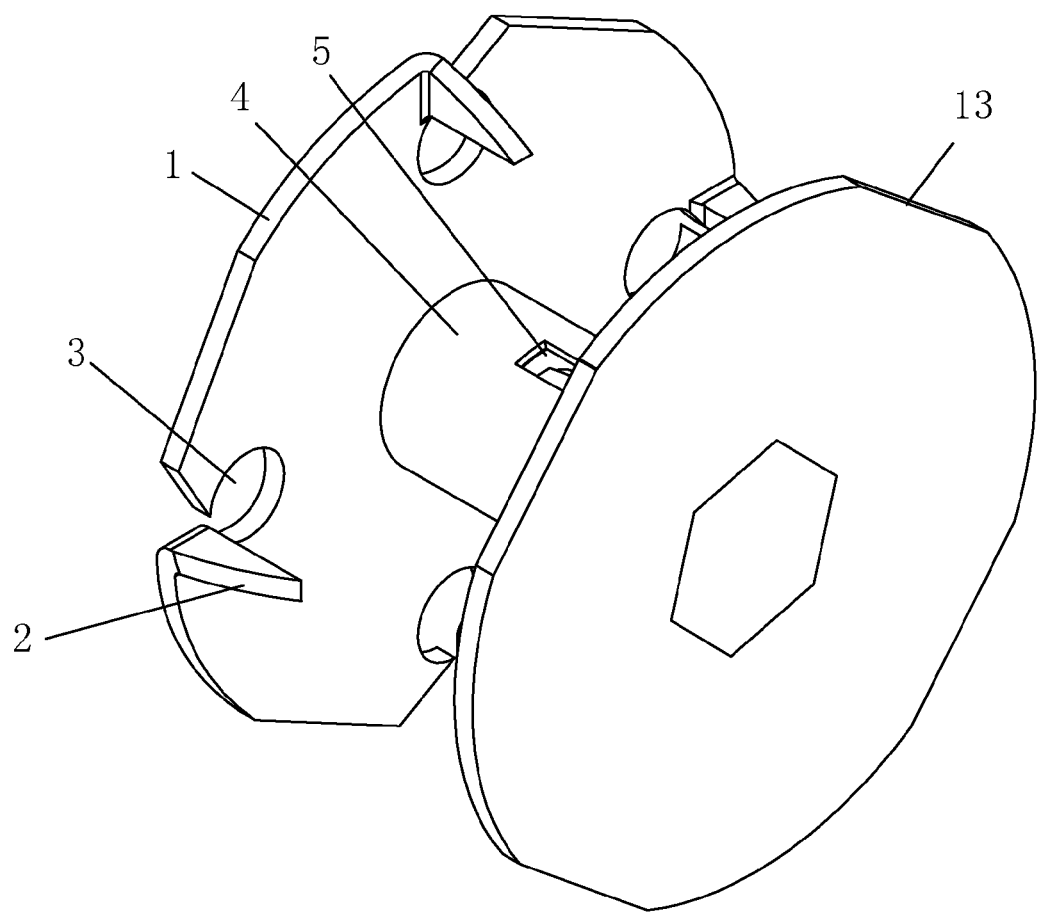
FIG. 3 is a perspective view showing the assembly of the fastener assembly according to the preferred embodiment of the present invention.
Figure 4:
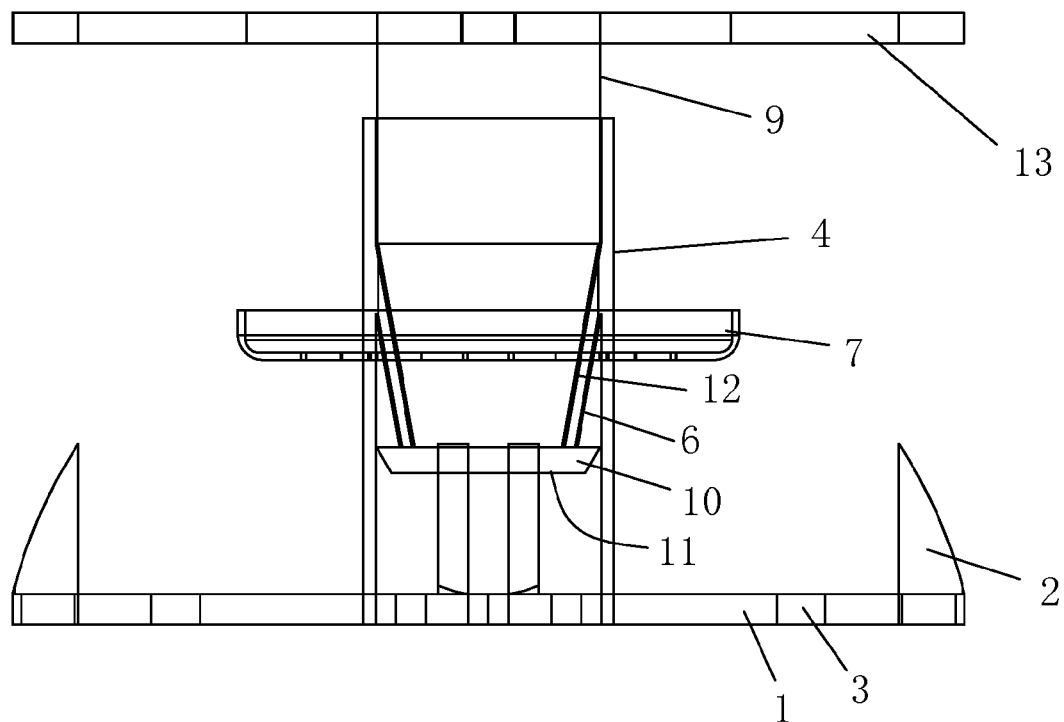
FIG. 4 is a side plan view showing the assembly of the fastener assembly according to the preferred embodiment of the present invention.

With reference to FIGS. 1 to 4, a fastener assembly according to a preferred embodiment of the present invention comprises: a first disc 1 with a plurality of tip teeth 2, an engaging cylinder 4, a second disc 7, a retaining element 9, and a third disc 13. The engaging cylinder 4 is hollow and includes a first engagement structure formed on an inner wall thereof, and the engaging cylinder 4 is connected with the first disc 1 to form a main fastener. The second disc 7 includes a through hole 8 defined on a central position thereof and plural recesses radially extending from a peripheral side of the through hole 8, wherein the engaging cylinder 4 inserts through and retains with the through hole 8 of the second disc 7 so that the engaging cylinder 4 engages with the second disc 7. The retaining element 9 is cylindrical or columnar and includes a second engagement structure arranged on a first end thereof, wherein a second end of the retaining element 9 is coupled with the third disc 13 to form an auxiliary fastener, and the first end of the retaining element 9 is inserted into the engaging cylinder 4 so that the first engagement structure engages with the second engagement structure, thus retaining the main fastener with the auxiliary fastener.

The first engagement structure has plural elongated orifices 5 defined on an outer wall of the engaging cylinder 4 and plural flexible slats 6 extending to the inner wall of the engaging cylinder 4 from the plural elongated orifices 5, wherein a length of each elongated orifice 5 is equal to that of each flexible slat 6, and a first end of each flexible slat 6 adjacent to the first disc 1 is a free end and extends into the engaging cylinder 4 to engage with the retaining element 9, a second end of each flexible slat 6 is one piece formed with the engaging cylinder 4.

In this embodiment, a number of the plural flexible slats 6 is two, and two flexible slats 6 are symmetrically one piece formed with the engaging cylinder 4 and extending into the engaging cylinder 4 at a same depth.

The second engagement structure has a snap portion 10 radially extending from the first end of the retaining element 9 and a conical section 12 defined between the snap portion 10 and the second end of the retaining element 9. The snap portion 10 is formed in a conical disk shape and has a small-diameter segment 11 arranged on the first end of the retaining element 9 to insert into the engaging cylinder 4; or the snap portion 10 is formed in a conical post shape and has the small-diameter segment 11 arranged on the first end of the retaining element 9 to insert into and retain with the engaging cylinder 4, such that when the retaining element 9 is inserted into the engaging cylinder 4, a gap is formed between the conical section 12 and the inner wall of the engaging cylinder 4 so that the two flexible slats 6 insert into the engaging cylinder 4 to retain with the snap portion 10.

Preferably, a number of the plurality of tip teeth 2 is at least four tip teeth symmetrically arranged on the first disc 1 and piercing into a cardboard to position the first disc 1 and the cardboard together.

The first disc 1 also includes plural fixing apertures 3 for removing the first disc 1 from the cardboard easily.

Thereby, when sewing a package box of the cardboard, the main fastener and the auxiliary fastener are placed on an inner paper board and an outer paper board of the cardboard so that the first disc 1 of the main fastener is fixed on the inner paper board, and the plurality of tip teeth 2 of the first disc 1 pierces into the inner paper board, the third disc 13 of the auxiliary fastener is mounted on the outer paper board, the second disc 7 is defined between the inner paper board and the outer paper board, thereafter the auxiliary fastener is pressed to fasten with the main fastener.

Preferably, the fastener assembly of the present invention is also applicable for a wooden board of the package box.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fastener assembly comprising:
a first disc with a plurality of tip teeth, an engaging cylinder, a second disc, a retaining element, and a third disc, characterized in that:
the engaging cylinder is hollow and includes a first engagement structure formed on an inner wall thereof, and the engaging cylinder is connected with the first disc to form a main fastener;
the second disc includes a through hole defined on a central position thereof and plural recesses radially extending from a peripheral side of the through hole, wherein the engaging cylinder inserts through and retains with the through hole of the second disc so that the engaging cylinder engages with the second disc;
the retaining element is cylindrical or columnar and includes a second engagement structure arranged on a first end thereof, wherein a second end of the retaining element is coupled with the third disc to form an auxiliary fastener;
the first end of the retaining element is inserted into the engaging cylinder so that the first engagement structure engages with the second engagement structure, thus retaining the main fastener with the auxiliary fastener.

2. The fastener assembly as claimed in claim 1, characterized in that the first engagement structure has plural elongated orifices defined on an outer wall of the engaging cylinder and plural flexible slats extending to the inner wall of the engaging cylinder from the plural elongated orifices, and a first end of each flexible slat adjacent to the first disc is a free end and extends into the engaging cylinder to engage with the retaining element, a second end of each flexible slat is one piece formed with the engaging cylinder.

3. The fastener assembly as claimed in claim 2, characterized in that a number of the plural flexible slats is at least one.

4. The fastener assembly as claimed in claim 1, characterized in that the second engagement structure has a snap portion radially extending from the first end of the retaining element and a conical section defined between the snap portion and the second end of the retaining element; the snap portion is formed in a conical disk shape and has a small-diameter segment arranged on the first end of the retaining element to insert into the engaging cylinder; or the snap portion is formed in a conical post shape and has the small-diameter segment arranged on the first end of the retaining element to insert into and retain with the engaging cylinder, such that when the retaining element is inserted into the engaging cylinder, a gap is formed between the conical section and the inner wall of the engaging cylinder so that two flexible slats insert into the engaging cylinder to retain with the snap portion.

5. The fastener assembly as claimed in claim 1, characterized in that a number of the plurality of tip teeth is at least four tip teeth symmetrically arranged on the first disc.

6. The fastener assembly as claimed in claim 1, characterized in that the first disc also includes plural fixing apertures for removing the first disc from a cardboard easily.

* * * * *